United States Patent [19]

Lang et al.

[11] Patent Number: 5,051,389

[45] Date of Patent: Sep. 24, 1991

[54] CATALYST COMPOSITION PREPARED BY VAPOR DEPOSITING ONTO A CARBON SUPPORT

[75] Inventors: Robert J. Lang, Baytown, Tex.; Claude C. Culross, Baton Rouge, La.; Lonnie W. Vernon, Baytown, Tex.; William E. Winter, Baton Rouge, La.

[73] Assignee: Exxon Research and Engineering Company, Florham Park, N.J.

[21] Appl. No.: 542,679

[22] Filed: Jun. 25, 1990

Related U.S. Application Data

[63] Continuation of Ser. No. 97,046, Sep. 16, 1987, abandoned.

[51] Int. Cl.$^5$ .................... B01J 21/18; B01J 23/28; B01J 27/051; C10G 1/06
[52] U.S. Cl. .................... 502/185; 208/111; 208/216 R; 208/419; 208/421; 502/181; 502/182; 502/183; 502/184; 502/219; 502/220; 502/221; 502/222
[58] Field of Search .................... 502/5, 181-185, 502/220-233, 34, 255, 321, 322

[56] References Cited

U.S. PATENT DOCUMENTS

| 2,223,777 | 12/1946 | Beeck et al. | 502/338 |
| 2,599,978 | 6/1952 | Davis et al. | 502/523 |
| 2,976,254 | 3/1961 | Mason et al. | 502/220 |
| 4,046,712 | 9/1977 | Cairns et al. | 502/5 |
| 4,719,195 | 1/1988 | Toulhoat et al. | 502/223 |
| 4,831,003 | 5/1989 | Lang et al. | 502/182 |

FOREIGN PATENT DOCUMENTS

| 1086106 | 7/1960 | Fed. Rep. of Germany | 502/185 |
| 2722771 | 12/1977 | Fed. Rep. of Germany | 502/185 |
| 3330621 | 3/1984 | Fed. Rep. of Germany | 502/185 |

*Primary Examiner*—Paul E. Konopka
*Attorney, Agent, or Firm*—Henry E. Naylor; Wayne Hoover

[57] ABSTRACT

A catalyst composition prepared by depositing a metal or metal compound onto a preformed carbon support and thereafter converting said metal or metal compounds to an oxide or sulfide having hydrogenation activity. The metal is selected from the group of metals consisting of Groups II-B, IV-B, IV-A, V-A, VI-A, VII-A and VIII-A metals of the Periodic Table of the Elements. The catalyst compositions are useful in hydroconversion and hydrotreating processes.

11 Claims, 1 Drawing Sheet

5,051,389

CATALYST COMPOSITION PREPARED BY VAPOR DEPOSITING ONTO A CARBON SUPPORT

This is a continuation of application Ser. No. 097,046, filed Sept. 16, 1987, now abandoned.

BACKGROUND OF THE INVENTION

This invention relates to a catalyst composition and to processes wherein said catalyst composition is used. More particularly, this invention relates to a supported heterogeneous catalyst composition and to processes wherein various carbonaceous materials are contacted with hydrogen and wherein said heterogeneous catalyst composition is used.

Heretofore, several hydroconversion and/or hydrotreating catalysts have been identified and used in various hydroconversion and/or hydrotreating processes. In general, the catalyst compositions heretofore proposed comprised at least one transition metal oxide or sulfide, particularly a Group VI or Group VIII metal oxide or sulfide, and the catalyst may be either supported or nonsupported. As is well known in the prior art, and in both cases, the metal oxide or sulfide may be preformed and used directly to produce the catalyst composition or the oxide or sulfide may be produced from a suitable precursor which will either decompose to or be readily converted to the metal oxide or sulfide either prior to or during the hydroconversion and/or hydrotreating operation.

As is well known in the prior art, the catalysts proposed heretofore are useful in the hydroconversion of various carbonaceous materials such as coal, lignite, peat, bitumen, heavy oils and the like to lower molecular weight products which may be either gaseous, liquid or a mixture of gaseous and liquid materials. The catalysts proposed heretofore are also useful in various hydrotreating processes such as hydrodeoxygenation, hydrodenitrogenation and hydrodesulfurization processes wherein the oxygen, nitrogen and/or sulfur contents of the feedstocks is effectively reduced. In general, the supported, heterogeneous catalysts heretofore proposed are not as active in the various hydroconversion and/or hydrotreating processes as are the nonsupported catalysts prepared by decomposition or conversion of a suitable precursor, particularly a precursor that is soluble in either the feedstock to be hydroconverted or hydrotreated or at least the solvent used in the hydroconverting or hydrotreating process. As a result, considerable effort has been devoted to the development of hydroconverting or hydrotreating catalysts produced in situ via the decomposition or conversion of a suitable precursor.

As is well known in the prior art, the effectiveness of hydroconversion and hydrotreating catalysts produced via the decomposition or conversion of a soluble precursor has been limited apparently by the respective solubility of the precursor either in the feedstock or the solvent used in the process prior to its decomposition or conversion to the corresponding metal oxide or sulfide and, perhaps, to some extent, by the temperature at which this decomposition or conversion is accomplished. While the reason or reasons for this limitation on catalytic effectiveness is not well known, it is believed to be due either to the large particle size of the active catalyst species ultimately formed directly or through agglomeration in the reaction media or to poor distribution of the active catalyst species within the reaction mixture. In any case, it is frequently difficult to control the effectiveness, particularly the catalytic activity, of a catalyst which is prepared via the decomposition or conversion of a precursor compound. These catalysts have not, therefore, always resulted in maximum or optimum effectiveness when used in the various hydroconversion and hydrotreating operations. There is, then, a need for an improved catalyst composition which will be more effective in the various hydroconversion and hydrotreating processes.

SUMMARY OF THE INVENTION

It has now been discovered that the foregoing and other disadvantages of the prior art catalyst compositions can be avoided, or at least reduced, with the catalyst compositions of this invention and improved hydroconversion and hydrotreating processes provided by using said catalyst compositions therein. It is, therefore, an object of this invention to provide an improved catalyst composition. It is another object of this invention to provide improved hydroconversion and hydrotreating processes wherein the improved catalyst compositions of this invention are used. It is still a further object of this invention to provide such an improved catalyst which will permit increased conversion in various hydroconversion and hydrotreating processes. It is yet another object of this invention to provide an improved hydroconversion process wherein the yield of lower molecular weight, liquid products is increased. It is still another object of this invention to provide improved hydrotreating processes wherein the amount of heteroatoms such as nitrogen, sulfur, oxygen and the like removed is increased. The foregoing and other objects and advantages will become apparent from the description of the invention set forth hereinafter, the examples contained therein and the drawing appended thereto.

In accordance with the present invention, the foregoing and other objects and advantages are accomplished with a supported catalyst composition comprising at least one metal oxide or sulfide and a preformed carbon support. The catalyst composition will be formed by depositing one or more metals and/or metal compounds onto a preformed carbon support from the vapor phase at an elevated temperature. The metals and/or metal compounds actually incorporated onto the carbon support may, when necessary, then be converted to an active oxide or sulfide. As indicated more fully hereinafter, it is important that the preformed carbon support have a maximum primary particle size in any direction within the range from about 50 to about 5000 Angstroms, although structures built or formed from the primary particles may be larger. Surface areas of the primary particles will be greater than 100 m$^2$/g.

DETAILED DESCRIPTION OF THE INVENTION

Figure 1:
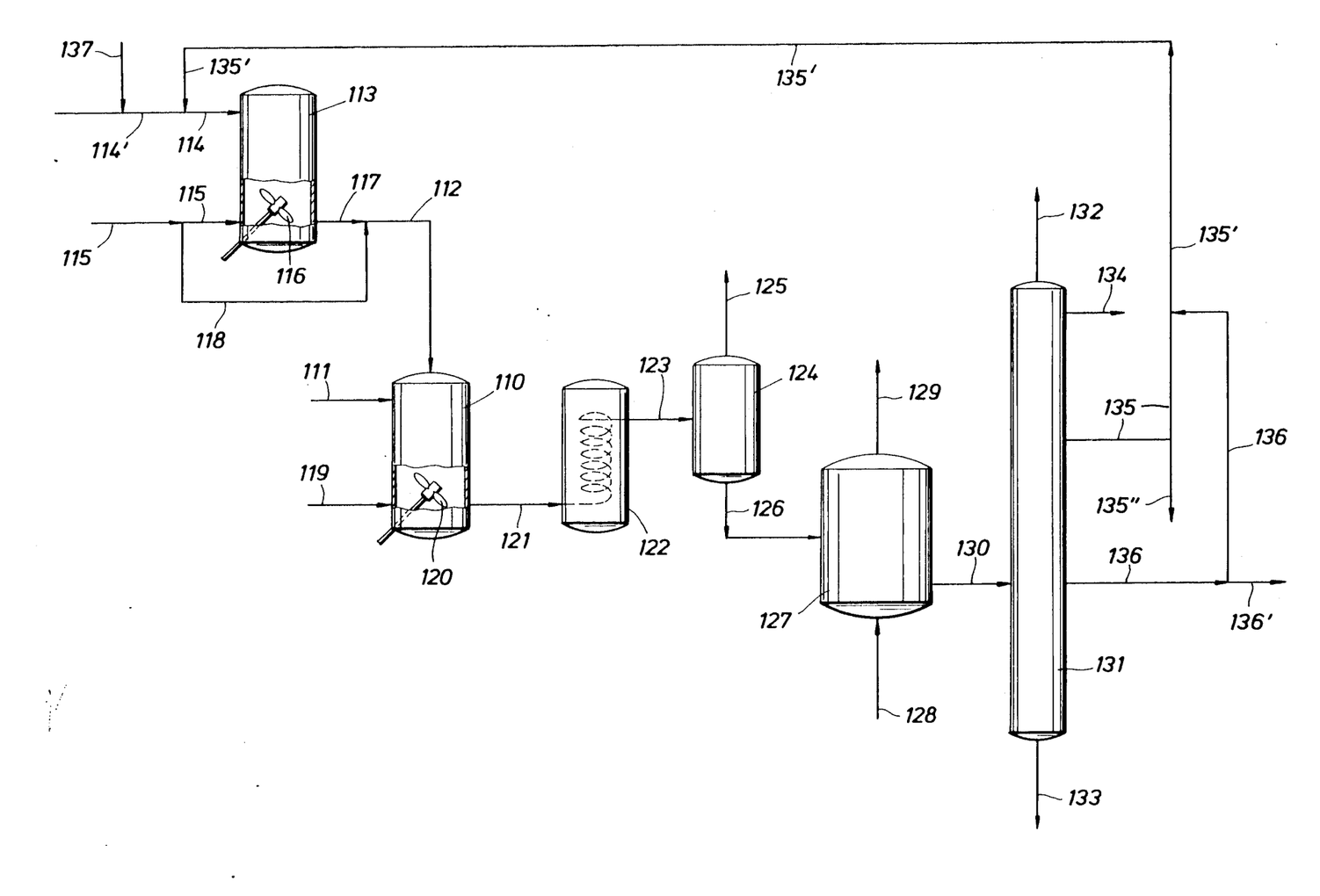
The FIGURE is a schematic flow diagram of a hydroconversion process within the scope of the present invention.

As indicated supra, the present invention relates to a catalyst composition and to hydroconversion and hydrotreating processes wherein said catalyst composition is used. As also indicated supra, the catalyst composition will comprise at least one metal oxide or sulfide and a preformed carbon support. As further indicated supra, the metal or metals will be deposited on the preformed carbon support via vapor phase deposition.

In general, any of the metals known in the prior art to exhibit hydrogenation activity in the oxide or sulfide form may be used in the catalyst composition of this invention. Suitable metals, then, include the metals of Groups II-B, IV-B, IV-A, V-A, VI-A, VII-A and VIII-A of the Periodic Table of the Elements and mixtures of such metals. As used herein, all reference to Groups of the Periodic Table of the Elements shall mean as these elements are depicted in the Periodic Table of the Elements published by Sargent-Welch Scientific Company and copyrighted 1980. The metals in these Groups include zinc, cadmium, mercury, germanium, tin, lead, titanium, zirconium, hafnium, vanadium, niobium, tantalum, chromium, molybdenum, tungsten, manganese, technetium, rhenium, iron, cobalt, nickel and the noble metals including platinum, iridium, palladium, osmium, ruthenium and rhodium. As is well known, the metals of Group VI-A, particularly molybdenum, and Group VIII-A, particularly the metals of the iron group; viz., iron, cobalt and nickel, are particularly effective as hydrogenation catalysts and these metals are, therefore, preferred either singly or in combination in the catalyst compositions of this invention.

As indicated supra, the metal component of the catalyst composition of this invention will be incorporated onto the preformed carbon support via vapor phase deposition of sublimed or otherwise vaporized metals or metal compounds. In general, the metal may be incorporated or deposited onto the preformed carbon support in any form that may be ultimately converted to an active oxide or sulfide. As is well known in the prior art, sublimation occurs when a solid goes to a vapor phase and then back to a solid without the formation, apparently at least, of a liquid phase. As is also well known in the prior art, all metals and metal compounds have a significant vapor pressure, particularly at elevated temperatures. Sublimation and vaporization is, of course, independent of external pressure, but lower pressures, particularly vacuums, can increase the vaporization rate of a metal or metal compound. Moreover, increased temperature significantly increases the vapor pressure of a metal or metal compound. As a result, elevated temperatures will be used in preparing the catalyst compositions of the present invention.

In general, any metal or metal compound may be used as a source of the metal or metals deposited on the preformed carbon support in the catalyst composition of the present invention. This includes metals and metal compounds requiring extremely high temperatures to effect vapor phase deposition since the carbon support is resistant to sintering. Suitable metal compounds, then, include the metals, per se, and various metal salts such as the metal halides, metal sulfides, metal borates and the like and various metal oxides such as those formed by the reaction of the metal and oxygen in varying oxidation states of the metal. In general, and after the metal or a metal compound has been deposited onto the carbon support, the metal or metal compound will be converted to an active oxide or sulfide form. In this regard, and as is well known in the prior art, all metals known to have hydrogenation activity do not exhibit good hydrogenation activity in all valence states and, as a result, even when the metal is incorporated as an oxide or sulfide, it is frequently necessary to further oxidize or reduce the metal oxide or sulfide actually deposited on the carbon support to produce an active hydrogenation catalyst.

In general, the metal, a mixture of metals, a metal compound and/or a mixture of metal compounds will be vaporized by heating to a temperature within the range from about 200° C. to about 2000° C. in the presence of a suitable preformed carbon support and then cooled such that the metal or metal compound is deposited and possibly chemisorbed onto the carbon support. The metal, metals, metal compound and/or metal compounds may, then, be heated in the presence of a preformed carbon support. In general, any of the preformed carbons known in the prior art, which carbons are three dimensional structures having a maximum dimension in any direction within the range from about 50 to about 5000 Angstroms may be used as the carbon support in the catalyst composition of this invention. Suitable carbons, then, include soot, carbon black, graphite and the like.

Surprisingly, it has been discovered that when a metal or metal compound is deposited on a suitable carbon support from a vapor phase and then converted to an active oxide or sulfide form, the active catalyst species, which again is a three dimensional structure, may be in the form of a molecular film or a roughly spherical particle having a maximum dimension in any direction up to about 150 Angstroms. This is, of course, generally significantly smaller than active catalysts formed via the decomposition or conversion of soluble precursors. As a result, the catalyst composition of this invention is, even though supported, generally more active than those hydrogenation catalysts heretofore prepared from soluble precursors. Moreover, due to the supported nature of the catalyst compositions of this invention, the active metal components are not easily agglomerated at hydroconversion and hydrotreating operating conditions. In general, the catalyst compositions of this invention will comprise from about 1 to about 10 parts by weight of metal per 100 parts by weight carbon.

The catalyst compositions of the present invention are particularly useful in hydroconversion processes wherein various carbonaceous materials are converted to lower molecular weight products, particularly liquid products, in the presence of hydrogen. The catalyst compositions of this invention are also useful in hydrotreating processes such as hydrodenitrogenation processes, hydrodeoxygenation processes, hydrodesulfurization processes and the like. In fact, hydrodesulfurization, hydrodenitrogenation, hydrodeoxygenation and the like frequently occur when sulfur, nitrogen and oxygen containing feedstocks are hydroconverted. As is well known, hydroconversion and hydrotreating processes are generally operated at an elevated temperature and pressure. As is also well known, hydrotreating processes are generally operated at milder conditions than are hydroconversion operations wherein hydrocracking is a desired result.

In general, the catalyst composition of this invention may be used to convert any non-gaseous carbonaceous material which is subject to hydrogenation and conversion to lower molecular weight products, particularly lower molecular weight liquid products. The catalysts of this invention are particularly effective in the hydroconversion of higher molecular weight carbonaceous materials which may be either normally solid or normally liquid and which may be either solid or liquid at conversion conditions. Particularly suitable carbonaceous materials, then, include solid carbonaceous materials such as coal, trash, biomass, tars and bitumen, shale oil and the like and liquid carbonaceous materials such as atmospheric and vacuum petroleum residuals and the like. In general, the heavy atmospheric and vacuum petroleum residual oils will have an initial boiling point within the range from about 650° F. to about 1050° F.

In general, and when the carbonaceous material to be hydroconverted is solid at conversion conditions, the carbonaceous material will be ground to a finely divided state and processed in a suitable solvent or diluent. The particular particle size or particle size range actually employed, however, is not critical to the invention and, indeed, essentially any particle size could be employed. Notwithstanding this, generally, such solid carbonaceous materials will be ground to a particle size of less than about ¼ inch and preferably to a particle size of less than about 8 mesh (NBS sieve size) to facilitate movement through the processing equipment. When the carbonaceous material to be processed is liquid at the hydroconversion conditions, the carbonaceous material may also be combined with a suitable solvent or diluent but the use of such a solvent or diluent is not critical or essential and, indeed, the catalyst composition of this invention may be added directly to such carbonaceous materials, particularly at elevated temperatures.

In general, the catalyst compositions of this invention will be added to or combined with the carbonaceous material to be hydroconverted or hydrotreated at a concentration within the range from about 50 ppm to about 5000 ppm, by weight, metal, based on dry, ash-free (DAF) carbonaceous material. In general, the catalyst composition may be added to the solvent or diluent and then combined with the carbonaceous material or combined with the carbonaceous material and then with the solvent or diluent, when a solvent or diluent is used. In either case, the metal or metals will be highly dispersed in the reaction medium and do not agglomerate during the hydroconversion or hydrotreating operations. Moreover, and surprisingly, the catalyst compositions of this invention do not result in significant coke make during the hydroconversion or hydrotreating operations.

After the mixture of catalyst composition and carbonaceous material has been prepared either with or without a solvent or diluent the mixture will be passed either to a carbonaceous material hydroconversion zone or a hydrotreating zone wherein the carbonaceous material will, respectively, either be at least partially converted to lower molecular weight products in the presence of hydrogen or have one or more heteroatoms at least partially removed therefrom. In general, hydroconversion will be accomplished at a temperature within the range from about 500° F. to about 1000° F. and at a total pressure within the range from about 500 psig to about 7000 psig in the presence of molecular hydrogen at a partial pressure within the range from about 400 psig to about 5000 psig. Hydrotreating, on the other hand, will, generally, be accomplished at a temperature within the range from about 500° F. to about 850° F. at a total pressure within the range from about 500 psig to about 3000 psig in the presence of molecular hydrogen at a partial pressure within the range from about 400 psig to about 2500 psig. In both operations, the desired conversion may be accomplished either in a single stage or in a plurality of stages. In general, the total nominal holding time at conversion conditions will range from about 30 minutes to about 180 minutes.

In general, conversion of the carbonaceous material in a hydroconversion process to lower molecular weight products will result in the production of a normally gaseous product, a normally liquid product and a bottoms product which will have characteristics similar to or identical to those of the feed material. In this regard, it should be noted that when the carbonaceous material is a normally solid material, the bottoms product will be normally solid. When the carbonaceous material is a normally liquid, heavy oil, on the other hand, the bottoms product will be a high boiling liquid product. In hydrotreating processes, on the other hand, the conversion will, generally, retain the feed stock in substantially the same form except that a gaseous product containing one or more heteroatoms such as $H_2S$, $H_3N$, $H_2O$ and the like will be liberated. In the hydroconversion process, the catalyst in some form, will, generally, be primarily in the bottoms product fraction. In the hydrotreating operations, on the other hand, the catalyst will generally remain in a liquid fraction which may be the solvent if a normally solid feed material were hydrotreated and either the feed or the solvent if a liquid carbonaceous material were hydrotreated.

In general, and when a plurality of conversion stages or zones are employed in the hydroconversion process, the gaseous and lighter boiling liquid hydrocarbons will, generally, be separated between each stage. Normally, this separation would include all components having a boiling point below about 350° F. to about 450° F. Moreover, after the lower boiling point materials have been separated, a portion of the remaining slurry could be recycled to any previous stage so as to increase the total conversion realized in the process and to increase the catalyst concentration in the zones through which the portion is recycled. When a single conversion stage or zone is employed or after the final stage when a plurality of conversion stages or zones are used, the product from the conversion will, generally, be separated into at least three product streams. Moreover, in those operations wherein a solvent is used, the spent solvent will be separated from the normally liquid product. In this regard, it should be noted that when the carbonaceous material is a solid and particularly coal, lignite, peat or the like, the solvent fraction will, preferably, have an initial boiling point within the range from about 450° F. to about 750° F. and a final boiling point within the range from about 900° F. to about 1050° F. When a solvent is used with a heavy oil, on the other hand, the solvent fraction will, preferably, have an initial boiling point within the range from about 200° F. to about 750° F. and a final boiling point within the range from about 900° F. to about 1050° F. When a plurality of stages or zones are employed in a hydrotreating process, the gaseous product containing the heteroatom or heteroatoms will be separated from each stage. A portion of the feed material may also be recycled to any previous stage for substantially the same reasons as recycle might be used in the hydroconversion process. When a single conversion stage or zone is employed in a hydrotreating process or after the final stage when a plurality of conversion stages or zones is used, and, solvent introduced initially will generally be separated and reused as will the metal components of the catalyst. In this regard, and in either process, when the feed was totally liquid in a hydrotreating process or when the bottoms are liquid from a hydroconversion process, the catalyst may be readily recovered via filtration or distillation.

After a carbonaceous material has been converted in a hydroconversion process, the gaseous product may be upgraded to a pipeline gas or the same may be burned to provide energy for the conversion process. Alternatively, all or any portion of the gaseous product may be reformed to provide hydrogen for the hydroconversion process.

The liquid product from a hydroconversion process may be fractionated into essentially any desired product distribution and/or a portion thereof may be used directly as a fuel or upgraded using conventional techniques. Generally, a naphtha fraction boiling in the motor gasoline range will be recovered and the naphtha fraction will be further processed to yield a high quality motor gasoline or similar fuel. Also, a middle distillate fraction may be separated from the liquid product and upgraded for use as a fuel oil or as a diesel oil. In a preferred embodiment any vacuum gas oil boiling range product will be recycled to extinction.

The bottoms product from a hydroconversion process wherein a normally solid carbonaceous material is hydroconverted may be gasified, depending upon its carbon content to produce hydrogen for the conversion process or the bottoms product may be burned to provide heat for the conversion process. In the case of relatively high carbon conversion during the hydroconversion, however, and when the carbon content is too low to make either gasification or combustion feasible, the bottoms product may simply be disposed of as a waste material. In this case, all or a portion of the catalyst may be recovered in either an active or inactive form. When the bottoms product is liquid, on the other hand, the liquid will, preferably, be recycled to extinction with excess catalyst being recovered using methods well known in the prior art.

A single stage embodiment of a process within the scope of the present invention is illustrated in the attached FIGURE and it is believed that this process will be better understood by reference to this FIGURE. Referring then to the FIGURE, a carbonaceous material is introduced in the preparation vessel 110 through line 111. As indicated supra, the carbonaceous material may be either normally solid or normally liquid. When the carbonaceous material is solid at the conditions at which it is introduced into preparation vessel 110, the carbonaceous material will be finely divided. In the preparation vessel, the carbonaceous material is combined with a catalyst composition comprising at least one metal oxide, sulfide or mixture thereof carried on a carbon support. The supported catalyst composition will have been prepared by contacting at least one metal or metal compound in the vapor phase with a suitable carbon support, cooling the mixture to a temperature at which the metal or metals and/or the metal compound or compounds deposits onto the preformed carbon support in the solid state and thereafter converting the metal(s) and/or metal compound(s) to the desired oxide or sulfide via means not illustrated in the FIGURE. Conversion of the metal(s) and/or metal compound(s) to the desired oxide or sulfide may, of course, be accomplished using techniques well known in the prior art. In the embodiment illustrated in the FIGURE, the catalyst composition is introduced into preparation vessel 110 through line 112. In a preferred embodiment, and particularly when the carbonaceous material is solid, the catalyst composition will have been previously combined with a suitable solvent or diluent. In the embodiment illustrated in the FIGURE, this combination may be accomplished in a suitable mixing vessel such as 113. In the embodiment illustrated in the FIGURE, a suitable solvent or diluent is introduced into mixing vessel 113 through line 114 while the catalyst composition is introduced into mixing vessel 113 through lines 115-115. Generally, mixing means such as agitator 116 may be provided in mixing vessel 113. The mixing vessel may be operated at any suitable temperature and the agitator will be operated at speeds sufficient to insure good distribution of the catalyst composition throughout the solvent or diluent. In the embodiment illustrated in the FIGURE, then, the catalyst composition dispersed in a suitable solvent or diluent is withdrawn from mixing vessel 113 through line 117 and thence into preparation vessel 110 through line 112. When a solvent or diluent is not used or when the catalyst composition and solvent are not premixed, the catalyst composition may be fed directly into line 112 from line 115 through line 118. In those embodiments wherein a solvent is used but not combined with the catalyst composition prior to introduction into preparation vessel 110, a suitable solvent or diluent may be introduced directly into preparation vessel 110 through line 119. Alternatively, additional solvent which may be the same or different from that introduced into mixing vessel 113 through line 114 may be introduced into preparation vessel 110 through line 119. To insure the preparation of a relatively uniform mixture of carbonaceous material, catalyst composition and solvent or diluent, when a solvent or diluent is used preparation vessel 110 may comprise suitable mixing means such as agitator 120. Generally, the preparation vessel 110 will be operated at conditions suitable for preparation of a satisfactory mixture. After the mixture of carbonaceous material, catalyst composition and solvent or diluent, when a solvent or diluent is employed, is prepared, the same will be withdrawn from the preparation vessel 110 through line 121. The mixture will then be heated to a temperature at or near conversion temperature by passing the same through preheater 122. The mixture is then withdrawn through line 123 and, when a carbonaceous material containing water has been used, the mixture may be passed to flash drum 124 wherein at least a portion of the water, as steam, may be flashed overhead through line 125 and a mixture suitable for hydroconversion withdrawn through line 126. The mixture is then fed to hydroconversion stage or zone 127 and is combined with molecular hydrogen added through line 128.

In the conversion zone 127, the carbonaceous material will be converted, at least in part, to lighter molecular weight products. The conversion will, generally, be achieved at a temperature within the range from about 500° F. to about 1000° F. and at a total pressure within the range from about 500 psig to about 7000 psig in the presence of hydrogen at a hydrogen partial pressure within the range from about 400 psig to about 5000 psig. In a preferred embodiment, the conversion will be achieved at a temperature within the range from about 750° F. to about 900° F. at a total pressure within the range from about 1500 psig to about 3000 psig and at a hydrogen partial pressure within the range from about 1200 psig to about 2500 psig. In the embodiment illustrated in the FIGURE, gaseous products and any unconsumed hydrogen may be withdrawn from the conversion zone through line 129. The remaining effluent from the hydroconversion, including any unreacted feed material and spent solvent or diluent, when a solvent or diluent is employed, will be withdrawn from the hydroconversion zone 127 through line 130.

The effluent from conversion stage or zone 127 withdrawn through line 130 is then fed to a suitable separator 131. The separator may consist of any suitable means for separating the effluent into its various fractions such as a gaseous fraction, a liquid fraction, and a bottoms fraction which, when a solid carbonaceous material is converted, will be normally solid. Suitable separation devices include, but are not necessarily limited to, knockout pots, which may be used alone or in combination with, filters, centrifuges, distillation apparatus and the like. In a preferred embodiment, and particularly when a solid carbonaceous material is converted, the separation means will be a distillation column comprising an atmospheric section and a vacuum section. When such a distillation apparatus is employed, a normally gaseous product (entrained gas not separated through line 129) may be withdrawn overhead through line 132. Similarly, a bottoms product which may be normally solid and include unconverted feed, catalyst and inorganic residue may be withdrawn through line 133. The normally liquid product may then be separated into fractions having any desired boiling range or ranges. For example, a relatively light boiling product, generally, a naphtha fraction boiling within the motor gasoline range may be withdrawn through line 134. A heavier boiling, middle distillate fraction, for example a fraction having an initial boiling point within the range from about 350° F. to about 450° F. and a final boiling point within the range from about 650° F. to about 850° F. may be withdrawn through line 135 and a still higher boiling, vacuum gas oil fraction, for example a fraction having an initial boiling point within the range from about 650° F. to about 850° F. and a final boiling point within the range from about 850° F. to about 1100° F. may be withdrawn through line 136.

In a preferred embodiment of the present invention and when a solid carbonaceous material is converted, particularly coal, lignite, peat and the like, at least a portion of the material having an initial boiling point within the range from about 650° F. to about 850° F. and a final boiling point within the range from 850° F. to about 1100° F. will be recycled and used as a solvent. The recycle may be accomplished through lines 136-136 and 135'-135' where the recycle solvent would be introduced into mixing vessel 113 through line 114. In the embodiment illustrated, the heavy boiling fraction may be combined with all or a portion of the middle distillate fraction withdrawn through lines 135-135. The combined fractions may then be recycled as solvent through lines 135'-135' and 114. When recycle solvent is not, however, used or when the amount of recycle solvent available is not sufficient, extraneous solvent may be introduced into line 114 through lines 137 and 114'. In those cases where the amount of solvent boiling range material is in excess of needs, the excess may be withdrawn through lines 135" and 136'. As indicated supra, it is, however, preferred that the higher boiling range liquid product be recycled to extinction so as to increase the yield of lower boiling products. In this embodiment, then, no liquid would be withdrawn through line 136'.

Any stream ultimately withdrawn from the separator may be used directly for any purpose as a final product or any portion or all of the streams may be further upgraded to yield products of enhanced value. For example, the gaseous stream withdrawn through line 129 and overhead through line 132 may be combined, scrubbed to separate pollutants and other noncombustible materials and treated so as to separate molecular hydrogen to yield a pipeline quality gas. Similarly, the lighter boiling fraction withdrawn through line 134, which boils generally in the motor gasoline range, may be further upgraded to yield a high quality gasoline. The fraction boiling in the middle distillate range or at least a portion thereof, may be further treated to yield a middle distillate fuel oil and in some cases to yield a diesel fuel. The heaviest boiling fraction withdrawn through line 136 may also be further treated to yield a satisfactory vacuum gas oil. The bottoms product withdrawn through line 133 may be burned directly to recover its fuel value, gasified or the same may be discarded directly, especially in those cases where the carbon content is too low to support combustion or justify gasification. As previously indicated, all or a part of the catalyst species may be separated prior to discarding. Moreover, a portion of the bottoms stream could be recycled to the conversion zone 127, though not illustrated, to increase the concentration of catalyst therein, thereby increasing the total conversion of carbonaceous material during the conversion step and reducing the amount of catalyst precursor added initially.

When the catalyst composition of the present invention is used in a hydrotreating operation, the schematic flow diagram of the process would be essentially the same as that illustrated in the FIGURE except that separator 131 would, generally, be somewhat simpler in that only the hydrotreated product, spent solvent, when a solvent is used, and the catalyst composition would need to be separated. As indicated supra, this generally could be accomplished with an atmospheric distillation apparatus and/or a suitable filter.

PREFERRED EMBODIMENT

In a preferred process embodiment of the present invention, a catalyst comprising molybdenum disulfide ($MoS_2$) on a preformed carbon support will be used to hydroconvert a coal or a vacuum petroleum residual boiling within the range from about 850° F. to about 1050° F. In a preferred catalyst composition embodiment, the catalyst will comprise from about 3 to about 8 parts of molybdenum per hundred parts of carbon support. The preformed carbon support will have a primary particle size within the range from about 50 to about 500 Angstroms and a surface area within the range from about 100 $m^2/g$ to about 1500 $m^2/g$. In a most preferred process embodiment of the present invention, a catalyst composition comprising molybdenum disulfide ($MoS_2$) and nickel sulfide (NiS) and a carbon support will be used to hydroconvert a coal. In a most preferred catalyst composition embodiment of this invention, the catalyst composition will comprise from about 3 to about 7 parts of molybdenum per hundred parts of carbon support and from about 0.15 to about 1.5 parts of nickel per hundred parts of carbon support. In the most preferred catalyst composition embodiment, the carbon support will have a primary particle size within the range from about 50 to about 500 Angstroms. In both the preferred and most preferred catalyst composition embodiments, the metal component will be deposited onto the carbon support by heating a molybdenum oxide or a molybdenum oxide precursor or a mixture of molybdenum oxide or a molybdenum oxide precursor and nickel halide, most preferably chloride, to a temperature within the range from about 1200° F. to about 1400° F. in the presence of a carbon support in an inert atmosphere and thereafter cooling the vaporized metal or metal compounds such that the desired amount of metal or metal compound deposits onto the support. In the preferred and most preferred catalyst composition embodiments, then, the metal oxide and metal halide, when present, will then be oxidized by contacting the mixture with a suitable oxidizing agent, preferably nitric acid or hydrogen peroxide at or near room temperature and at or near atmospheric pressure and thereafter drying in the presence of air or nitrogen at a temperature within the range from about 100° F. to about 300° F. at a pressure within the range from about 0.1 to about 1 atmosphere for a period of time within the range from about 30 to about 150 minutes. Air may, however, be used to effect the desired oxidation. When air is used, the oxidation will be accomplished at a temperature within the range from about 900° F. to about 1100° F. at a pressure within the range from about 0 psig to about 500 psig with a nominal holding time within the range from about 30 to about 150 minutes. The oxides will then be converted to the sulfides as the catalyst composition is heated to hydroconversion conditions as a result of the sulfur content in the feedstocks to be hydroconverted.

In the preferred process embodiment, the hydroconversion will be accomplished at a temperature within the range from about 750° F. to about 900° F. In a most preferred process embodiment, the hydroconversion will be accomplished at a temperature within the range from about 800° F. to about 880° F. Both the preferred and most preferred process embodiments will be accomplished at a total pressure within the range from about 1500 psig to about 3000 psig in the presence of hydrogen at a hydrogen partial pressure within the range from about 1200 psig to about 2500 psig. The hydroconversion will be accomplished in a single conversion zone or stage with a nominal holding time within the range from about 60 to about 120 minutes. In a preferred process embodiment of the present invention, sufficient catalyst will be used to provide from about 500 ppm to about 1500 ppm molybdenum based on dry, ash-free carbonaceous material. In a most preferred process embodiment of the present invention, sufficient catalyst will be used to provide from about 500 ppm to about 1500 ppm molybdenum and from about 100 ppm to about 300 ppm nickel based on dry, ash-free coal.

Having thus broadly described the present invention and a preferred and most preferred embodiment thereof, it is believed that the same will become even more apparent by reference to the following examples. It will be appreciated, however, that the examples are presented solely for purposes of illustration and should not be construed as limiting the invention.

EXAMPLE 1

In this experiment, two supported catalyst compositions were prepared by subliming molybdenum trioxide onto a preformed carbon support. In preparing the first catalyst, which first catalyst is hereinafter referred to as catalyst 1, 0.025 g of molybdenum trioxide were combined with 0.5 g of a commercially available carbon black having a surface area of 140 $m^2/g$ and a primary particle size of 190 Angstroms and then heating the mixture to a temperature between about 1200° F. and 1400° F. for about 15 minutes in a nitrogen atmosphere and then cooling. During this time, the vaporized molybdenum trioxide deposited onto the carbon black. In preparing the second catalyst, 0.025 g of molybdenum trioxide were combined with 0.5 g of a commercially available carbon black having a surface area of 1475 $m^2/g$ and a primary particle size of 150 Angstroms and thereafter heating the mixture to a temperature within the range from about 1200° F. to about 1400° F. for 15 minutes in a nitrogen atmosphere and then cooling. During this time, the vaporized molybdenum trioxide was deposited onto the carbon support. In the preparation of both catalysts, the molybdenum trioxide was reduced to molybdenum dioxide, which does not convert as readily as molybdenum trioxide to a sulfide form. As a final step in the preparation of both catalysts, then, the molybdenum dioxide was oxidized back to molybdenum trioxide by contacting the same with dilute nitric acid at room temperature and then drying in nitrogen under vacuum at 110° C. for several hours. After the oxidation step, catalyst 1 and catalyst 2 each contained 3 wt % molybdenum.

EXAMPLE 2

In this example, the catalysts prepared in Example 1 were used to hydrogenate naphthalene to tetralin at different catalyst concentrations. In this example, a series of runs were also completed in the presence of a catalyst formed in situ by the decomposition of a di-n-butyl substituted dithiocarbamate of $Mo^{+6}$. Each of the runs was completed by charging 0.03 g of naphthalene to a micro-reactor with a sufficient amount of supported catalyst or the di-n-butyl substituted dithiocarbamate of $Mo^{+6}$ to provide the desired amount of molybdenum in ppm based on naphthalene. Also, 1 mg of elemental sulfur was added to sulfide the catalyst in situ. Each of the series of runs was completed at 840° F. in the presence of molecular hydrogen at a partial pressure of 2000 psig and a nominal holding time of 60 minutes. The results of each run are summarized in the following Table which also shows the catalyst used, the catalyst loading in ppm molybdenum, based on naphthalene, and the percent of naphthalene converted to tetralin:

TABLE

| Catalyst | Catalyst Loading, ppm (Mo) | Naphthalene Conversion % |
| --- | --- | --- |
| 1 | 250 | 9.0 |
| 1 | 500 | 13.8 |
| 1 | 1000 | 17.0 |
| 2 | 250 | 10.5 |
| 2 | 500 | 16.0 |
| Mo DTC | 250 | 7.5 |
| Mo DTC | 500 | 10.5 |
| Mo DTC | 1000 | 12.0 |

As will be apparent from the data summarized in the preceding Table, catalyst 1 and 2, the catalysts within the scope of this invention, were significantly more effective in the hydrogenation of naphthalene than was the catalyst produced by the decomposition of the di-n-butyl substituted dithiocarbamate of $Mo^{+6}$ (MoDTC).

EXAMPLE 3

In this example, a series of supported catalysts containing varying amounts of molybdenum were prepared on a commercially available carbon black having a surface area of 200 $m^2/g$ using the same procedure described in Example 1 except that the amount of molybdenum trioxide initially combined with the carbon black was varied such that the ultimately oxidized supported catalyst contained 3.0, 4.5, 6.8 and 8.7 wt % molybdenum. These catalysts were then used to hydrogenate naphthalene to tetralin using the same procedure as outlined in Example 2. In each run, a sufficient amount of the supported catalyst was used to provide 500 ppm molybdenum in each case. The naphthalene conversion to tetralin was: 12.0% with the supported catalyst containing 3.0 wt % molybdenum; 14.1% with the catalyst containing 4.5 wt % molybdenum; 10.7% with the catalyst containing 6.8 wt % molybdenum; and 10.7% with the catalyst containing 8.7 wt % molybdenum. These results clearly indicate that supported catalyst compositions comprising significant molybdenum loadings can be used without any significant deactivation, thus lowering the amount of carbon support required. These data also, however, indicate an optimum loading within the range from about 3 wt % to about 5 wt % molybdenum.

EXAMPLE 4

In this example, two supported catalysts comprising molybdenum and nickel were prepared. In preparing the first catalyst, which catalyst is hereinafter referred to as catalyst 3, 0.025 g of molybdenum trioxide and 0.014 g of nickel chloride were combined with 0.5 g of a commercially available carbon black having a surface area of 140 m$^2$/g and a primary particle size of 190 Angstroms and thereafter heating the mixture to a temperature within the range from about 1200° F. to about 1400° F. for about 15 minutes in a nitrogen atmosphere and then cooling. During this time, the vaporized molybdenum oxide and vaporized nickel chloride were deposited onto the carbon black support. The cooled mixture was then treated with dilute nitric acid at room temperature and dried in nitrogen under vacuum at a temperature of 110° C. for several hours. This treatment, then, converted both metals to an active oxide form. The second catalyst of this example, which catalyst is hereinafter referred to as catalyst 4, was prepared by combining 0.025 g of molybdenum trioxide and 0.014 g of nickel chloride with 0.5 g of a commercially available carbon black having a surface area of 1475 m$^2$/g and a primary particle size of 150 Angstroms and thereafter heating the mixture to a temperature within the range from about 1200° F. to about 1400° F. for about 15 minutes in a nitrogen atmosphere and then cooling. During this time, the vaporized molybdenum oxide and nickel chloride were deposited onto the carbon black support. The resulting mixture was then treated with dilute nitric acid at room temperature and subsequently dried in nitrogen under vacuum at 110° C. for several hours. Again, this treatment converted both metals to an active oxide form.

EXAMPLE 5

In this example, the catalysts prepared in Example 4 were used in a series of runs to hydrogenate naphthalene to tetralin at different catalyst loadings. Each of the series of runs was completed at conditions identical to those summarized in Example 2 except that different catalysts were used at different catalyst loadings. The results obtained in each of the runs is summarized in the following Table which shows the catalyst used, the catalyst loading used and the percent of naphthalene converted to tetralin during the run:

TABLE

| Catalyst | Catalyst Loading, ppm (Mo) | Naphthalene Conversion % |
| --- | --- | --- |
| 3 | 125 | 10.7 |
| 3 | 250 | 14.5 |
| 3 | 500 | 18.0 |
| 3 | 1000 | 22.6 |
| 4 | 50 | 11.0 |
| 4 | 125 | 16.2 |
| 4 | 250 | 18.2 |
| 4 | 500 | 20.2 |

EXAMPLE 6

In this example, two supported catalysts comprising molybdenum and cobalt and two supported catalysts comprising molybdenum, nickel and cobalt were prepared. The first catalyst of this example, which catalyst is hereinafter referred to as catalyst 5, was prepared by combining 0.025 g of molybdenum trioxide and 0.014 g of cobalt chloride with 0.5 g of a commercially available carbon black having a surface area of 140 m$^2$/g and a primary particle size of 190 Angstroms and thereafter heating the mixture to a temperature within the range from about 1200° F. to about 1400° F. for 15 minutes in a nitrogen atmosphere and then cooling. During this time, the vaporized molybdenum oxide and cobalt chloride were deposited onto the carbon black support. The cooled mixture was then treated with dilute nitric acid at room temperature and subsequently dried in nitrogen under vacuum at 110° C. for several hours. The second catalyst of this example, which catalyst is hereinafter referred to as catalyst 6, was prepared by combining 0.025 g of molybdenum trioxide and 0.014 g of cobalt chloride with a commercially available carbon black having a surface area of 1475 m$^2$/g and a primary particle size of 150 Angstroms and then heating the mixture to a temperature within the range from about 1200° F. to about 1400° F. for 15 minutes in a nitrogen atmosphere and then cooling. During this time, the vaporized molybdenum oxide and cobalt chloride were deposited onto the carbon black support. The cooled mixture was then treated with dilute nitric acid at room temperature and subsequently dried in nitrogen under vacuum for several hours. The third catalyst of this example, which catalyst is hereinafter referred to as catalyst 7, was prepared by combining 0.025 g of molybdenum trioxide, 0.014 g of nickel chloride and 0.014 g of cobalt chloride with 0.5 g of commercially available carbon black identical to that used in the preparation of catalyst 5 and the mixture then heated to a temperature within the range from about 1200° F. to about 1400° F. for 15 minutes in a nitrogen atmosphere and then cooled. During this time, the vaporized molybdenum oxide, nickel chloride and cobalt chloride were deposited onto the carbon black support. The cooled mixture was then treated with dilute nitric acid at room temperature and subsequently dried in nitrogen under vacuum for several hours. The fourth catalyst of this example, which catalyst is hereinafter referred to as catalyst 8, was prepared by combining 0.025 g of molybdenum trioxide, 0.014 g of nickel chloride and 0.014 g of cobalt chloride with 0.5 g of the same commercially available carbon black as was used in the preparation of catalyst 6 and the mixture then heated to a temperature within the range from about 1200° F. to about 1400° F. for 15 minutes in a nitrogen atmosphere and then cooled. During this time, the molybdenum oxide, nickel chloride and cobalt chloride were deposited onto the carbon black support. The cooled mixture was then treated with dilute nitric acid at room temperature and subsequently dried in nitrogen under vacuum for several hours.

EXAMPLE 7

In this example, the catalysts prepared in Example 5 were used to hydrogenate naphthalene to tetralin using the procedure summarized in Example 2 except that different catalysts were used. The results of these runs, the concentration of each metal present during the run and the percent of naphthalene converted to tetralin are summarized in the following table:

TABLE

| Catalyst | Catalyst Loading, ppm | | | Naphthalene Conversion, % |
|---|---|---|---|---|
| | Mo | Ni | Co | |
| 5 | 500 | | 100 | 12.8 |
| 6 | 500 | | 100 | 17.5 |
| 7 | 500 | 100 | 100 | 14.5 |
| 8 | 500 | 100 | 100 | 16.2 |

EXAMPLE 8

In this example, each of the catalysts prepared in Examples 1, 4 and 6 were used to hydrodesulfurize dibenzothiophene to biphenyl. The hydrodesulfurization was accomplished by charging 0.03 g of dibenzothiophene and a sufficient amount of each catalyst to provide 1000 ppm molybdenum based on dibenzothiophene to a micro-reactor. The hydrodesulfurization was then completed at 840° F. in the presence of molecular hydrogen at 2000 psig at a nominal holding time of 60 minutes. The percent of dibenzothiophene converted to biphenyl in each of the hydrodesulfurization runs, the catalyst actually used and the metals loading are summarized in the following Table:

TABLE

| Catalyst | Catalyst Loading, ppm | | | Dibenzo-Thiophene Conversion, % |
|---|---|---|---|---|
| | Mo | Ni | Co | |
| 1 | 1000 | | | 4.0 |
| 2 | 1000 | | | 7.2 |
| 3 | 1000 | 200 | | 10.1 |
| 4 | 1000 | 200 | | 15.1 |
| 5 | 1000 | | 200 | 12.8 |
| 6 | 1000 | | 200 | 15.1 |
| 7 | 1000 | 200 | 200 | 15.8 |
| 8 | 1000 | 200 | 200 | 25.8 |

EXAMPLE 9

In this example catalyst composition 4 was used to hydrogenate naphthalene in the presence of two heavy petroleum feedstocks and a heavy solvent derived from a coal liquefaction process. These heavy feedstocks have a tendency to deactivate catalysts. In each of the hydrogenation runs, a 5 cc mini-bomb was charged with catalyst (500 ppm total metals on feed) and a mixture containing 40 wt % heavy feedstock and 60% napthalene plus a small amount of elemental sulfur to sulfide the catalyst. The amount of mixture charged was varied so that different amounts of hydrogen could be introduced. The run conditions that were used were 840° F. for 1 hour with shaking at 300 cycles per minute. At 840° F. the initial hydrogen pressure was 2500 psig.

A 6 wt % hydrogen treat rate was used for the heavy petroleum feedstocks which were a +1050° F. heavy Arab vacuum residuum and a +975° F. topped Cold Lake crude. A 9 wt % hydrogen treat rate was used for the 650° F.–1000° F. Illinois coal-derived solvent. A series of runs was also completed in the presence of a catalyst formed in situ by the decomposition of a di-n-butyl dithiocarbamate of $Mo^{+6}$. The results of these runs are summarized in the following Table:

TABLE

| Catalyst | Catalyst Loading, ppm | | Heavy Feedstock or Solvent | % Conversion Naphthalene to Tetralin |
|---|---|---|---|---|
| | Mo | Ni | | |
| Mo DTC | 500 | 0 | Heavy Arab Vacuum Resid | 23 |
| Mo DTC | 500 | 0 | Topped Cold Lake Crude | 23 |
| Mo DTC | 500 | 0 | Coal Liquefaction Solvent | 25 |
| 4 | 416 | 84 | Heavy Arab Vacuum Resid | 32 |
| 4 | 416 | 84 | Topped Cold Lake Crude | 33 |
| 4 | 416 | 84 | Coal Liquefaction Solvent | 34 |

These results clearly show that the supported catalyst of this invention is more active than the soluble catalyst in the presence of heavy feedstocks.

EXAMPLE 1

In this example, catalysts 1 and 3 were used to hydrogenate naphthalene in the presence of a heavy petroleum feedstock which has a tendency to deactivate catalysts. In each of these hydrogenations, a stirred autoclave was charged with 40 g of a heavy Arab vacuum residuum plus 60 g naphthalene and a small quantity of carbon disulfide to sulfide the catalyst during the run. Catalyst Compositions 1 and 3 were added, in separate runs, at a sufficient concentration to provide 500 ppm metal, based on total autoclave content. The runs were made with a constant hydrogen pressure of 2500 psig for 1 hour at 840° F. A run was also made using a soluble molybdenum naphthenate catalyst for comparison. The heavy petroleum feedstock used was a +975° F. Topped Cold Lake crude. The results are summarized in the Table below:

TABLE

| Catalyst | Catalyst Loading, wppm on Feed | | % Conversion Naphthalene to Tetralin |
|---|---|---|---|
| | Mo | Ni | |
| Mo Naphthenate | 500 | 0 | 24 |
| 1 | 500 | 0 | 32 |
| 3 | 416 | 84 | 36 |

From the results in this Table, it is apparent that the supported catalyst compositions of this invention are superior hydrogenation catalysts compared to the soluble Mo-naphthenate catalyst in the presence of heavy feedstocks.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the invention, what is claimed is:

1. A method for preparing a catalyst composition comprising molybdenum and a preformed carbon support, said method comprising the following steps:
   (a) vaporizing molybdenum trioxide;
   (b) contacting the vapor from step (a) with a preformed carbon support;
   (c) cooling said vapor to deposit molybdenum dioxide in an amount within the range from about 1 to about 10 parts by weight, per 100 parts by weight of carbon; and
   (d) reoxidizing said molybdenum dioxide to molybdenum trioxide with an oxidizing agent from the group consisting of air at a temperature from about 750° F. to about 900° F., nitric acid and hydrogen peroxide, thereby activating the catalyst composition.

2. The method of claim 1, further comprising the step of sulfiding the catalyst composition following the reoxidizing step.

3. The method of claim 1, wherein said catalyst support has a maximum dimension in any direction within the range from about 50 to about 5000 Angstroms.

4. The method of claim 1, further comprising depositing on said preformed carbon support a nickel compound in addition to a molybdenum compound.

5. The method of claim 1, further comprising depositing on said preformed carbon support a cobalt compound in addition to a molybdenum compound.

6. The method of claim 1, wherein said molybdenum trioxide is vaporized by heating to a temperature within the range from about 1200° F. to about 1400° F.

7. The method of claim 3, wherein said carbon support has a maximum dimension in any direction from about 50 to about 500 Angstroms.

8. The method of claim 1, wherein said reoxidizing is accomplished with nitric acid.

9. The method of claim 1, wherein said reoxidizing is accomplished with hydrogen peroxide.

10. The method of claim 1, wherein said reoxidizing is accomplished with air at a temperature of about 750° F. to about 900° F.

11. A method for preparing a catalyst composition having increased activity in hydroconversion processes, said method comprising the following steps:
   (a) vaporizing molybdenum trioxide;
   (b) contacting the vapor from step (a) with a preformed carbon support having a maximum dimension in any direction within the range from about 50 to about 5000 Angstroms;
   (c) cooling said vapor to deposit molybdenum dioxide in an amount within the range from about 1 to about 10 parts by weight, per 100 parts by weight of carbon; and
   (d) reoxidizing said molybdenum dioxide to molybdenum trioxide with an oxidizing agent from the group consisting of air at a temperature from about 750° F. to about 900° F., nitric acid and hydrogen peroxide thereby activating the catalyst composition;

wherein the active species of molybdenum trioxide is in the form of a three dimensional structure having a maximum dimension in any direction up to about 150 Angstroms.

* * * * *